United States Patent

Stufflebeam

Patent Number: 5,730,061
Date of Patent: Mar. 24, 1998

[54] AUTOMATIC CONVEYOR SYSTEM WITH DAMAGE-FREE GUIDE RAILS

[75] Inventor: Frank L. Stufflebeam, Johnston, Iowa

[73] Assignee: Ryko Manufacturing Company, Grimes, Iowa

[21] Appl. No.: 816,545

[22] Filed: Mar. 13, 1997

[51] Int. Cl.$^6$ ................................ B65G 25/00
[52] U.S. Cl. ............. 104/172.3; 134/125; 15/DIG. 2; 198/717
[58] Field of Search ............ 104/172.1, 172.3, 104/172.5, 172.2, 242; 198/717, 718, 719, 725, 732, 469.1; 134/123, 124, 125, 126, 127; 15/DIG. 2, 21.1

[56] References Cited

U.S. PATENT DOCUMENTS

| | | | |
|---|---|---|---|
| 3,288,109 | 11/1966 | Smith et al. | 134/123 |
| 3,526,193 | 9/1970 | Vani | 104/172.3 |
| 3,744,433 | 7/1973 | Bernardi | 104/172.3 |
| 4,039,075 | 8/1977 | Gray | 134/123 |
| 4,690,065 | 9/1987 | Belanger et al. | 104/172.3 |
| 4,981,151 | 1/1991 | Larson et al. | 134/125 |
| 5,291,906 | 3/1994 | White | 134/123 |

*Primary Examiner*—Mark T. Le
*Attorney, Agent, or Firm*—Zarley, McKee, Thomte, Voorhees, & Sease

[57] ABSTRACT

A guide rail assembly for use with a conveyor of an automatic conveyor car wash. The guide rail assembly is comprised of a main guide rail positioned outside the conveyor proximate the wheel portion of a vehicle, and a lower guide rail extending below and away from the main guide rail toward the conveyor such that the lower guide rail contacts the tire below the wheel portion to maintain a spaced apart relationship between the wheel portion and the main guide rail. The addition of the lower guide rail prevents scratching, marring, or any other structural damage to the wheel portion of the vehicle.

11 Claims, 2 Drawing Sheets

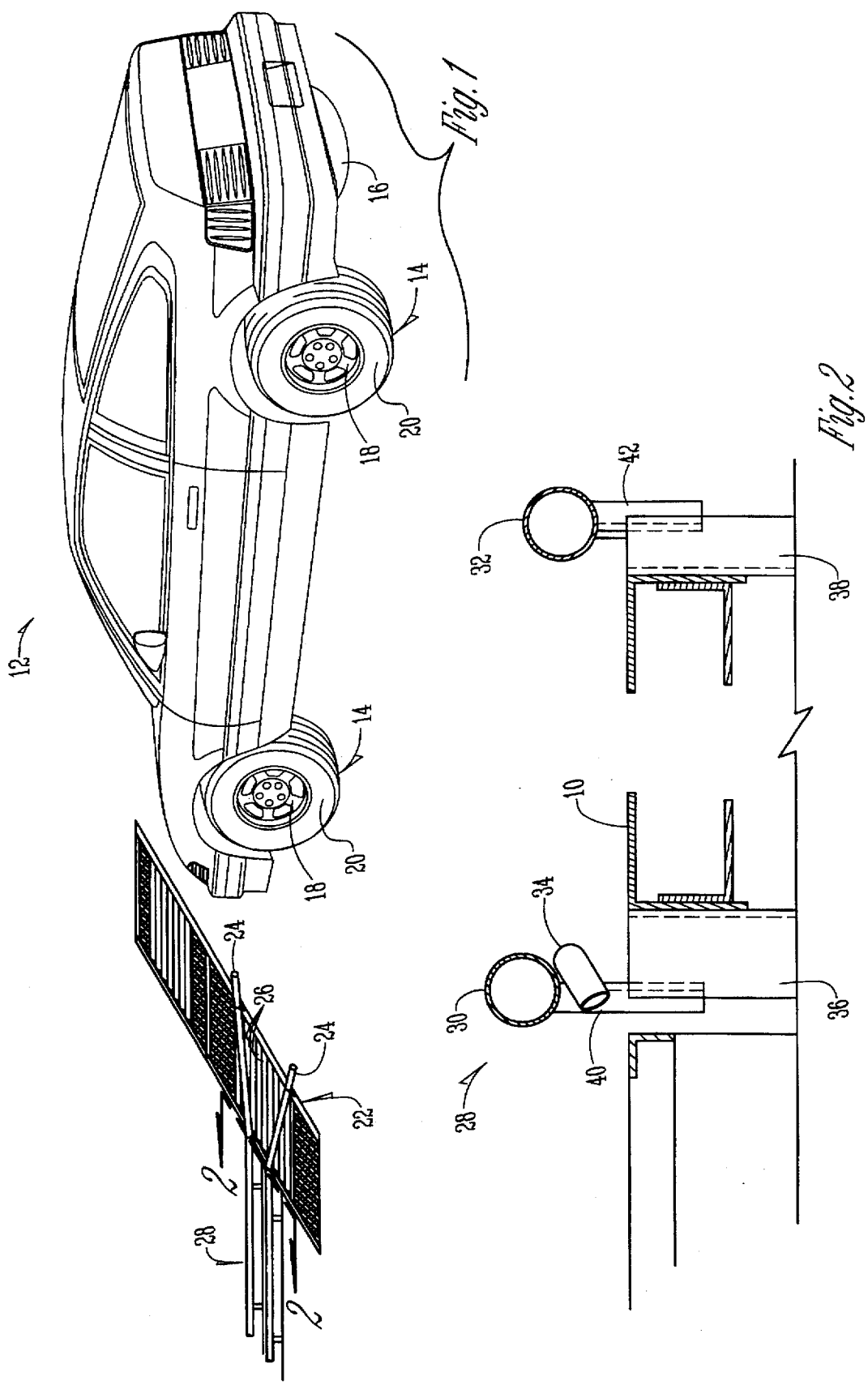

5,730,061

AUTOMATIC CONVEYOR SYSTEM WITH DAMAGE-FREE GUIDE RAILS

FIELD OF THE INVENTION

The present invention pertains to an automatic car wash and, in particular, guide rails for a conveyor in an automatic conveyor car wash.

BACKGROUND OF THE INVENTION

The use of an automatic conveyor car wash is well known. Such automatic car wash systems use a conveyor to move the vehicle through the car wash. Normally, the driver-side tires of the vehicle are directed onto the conveyor, which in turn, using a prior art conveyor system, either pulls or pushes the vehicle through the car wash as desired. It is important that the automatic car wash clean the vehicle without the conveyor system scratching, marring or causing any other structural damage to the wheels of the vehicle.

Although prior art automatic conveyor car wash systems have many desirable features, they also suffer from a significant problem. Guide rails are typically used, one on each side of the conveyor, to aid the driver in aligning the tires of the vehicle with the conveyor. The guide rails also ensure that the tires remain on the conveyor over the length of the car wash. Prior art guide rail assemblies present problems for hubcaps and other decorative wheel coverings. One guide rail is positioned along the outside edge of the conveyor sufficiently high above the conveyor so that the guide rail contacts the wheel portion of many vehicles, including any hubcap or other decorative wheel covering, thereby scratching, marring, or causing other structural damage to the wheel (see FIG. 3). The guide rail must be positioned at such a height to prevent tires, especially large truck tires, from jumping out of the conveyor. Thus, there is a need in the art for a guide rail assembly for an automatic conveyor car wash system that restricts the tires of the vehicle to the conveyor without causing structural damage to the wheel portion of the vehicle.

It is therefore the primary objective of the present invention to provide a guide rail assembly that improves upon or solves the problems and deficiencies existing in the art.

Another objective of the present invention is to provide a guide rail assembly that does not damage the wheel portion of the vehicle, including any hubcap or other decorative wheel covering, while ensuring that the tires of the vehicle remain on the conveyor.

A further objective of the present invention is to provide a method for adapting the guide rail assembly of an automatic conveyor car wash to restrict the tires of the vehicle to the conveyor without causing damage to the wheel portion.

Another objective of the present invention is to provide an improved rail assembly for an automatic conveyor car wash which is efficient in operation, economical to manufacture, and durable in use.

SUMMARY OF THE INVENTION

The foregoing objectives are achieved in a preferred embodiment of the invention by a guide rail assembly for a conveyor in an automatic conveyor car wash having a main guide rail positioned outside the conveyor proximate the wheel portion of the vehicle, and a lower guide rail disposed below and away from the main guide rail toward the conveyor. The lower guide rail is positioned such that it contacts the tire below the wheel portion and maintains a spaced apart relationship between the wheel portion and the main guide rail. As such, the lower guide rail effectively confines the tires to the conveyor without causing damage to the wheel portion, including any hubcap or other decorative wheel covering.

In its preferred form, the lower guide rail is angled away from the conveyor near the entrance of the automatic car wash. Angling the lower guide rail helps guide the tires of the vehicle into the correct position on the conveyor.

A method of adapting a prior art guide rail assembly comprising a main guide rail positioned proximate the wheel portion of the vehicle is also provided. The guide rail assembly is adapted by providing a lower guide rail which extends below and away from the main guide rail toward the conveyor such that the lower guide rail contacts the tire of the vehicle below the wheel portion to maintain a spaced apart relationship between the wheel portion and the main guide rail.

BRIEF DESCRIPTION OF THE DRAWINGS

FIG. 1 is a perspective view of a vehicle approaching the guide rail assembly of the present invention.

FIG. 2 is a sectional view taken along line 2—2 of FIG. 1 showing the alignment of the guide rail assembly of the present invention about the conveyor.

DETAILED DESCRIPTION OF THE INVENTION

Figure 3:
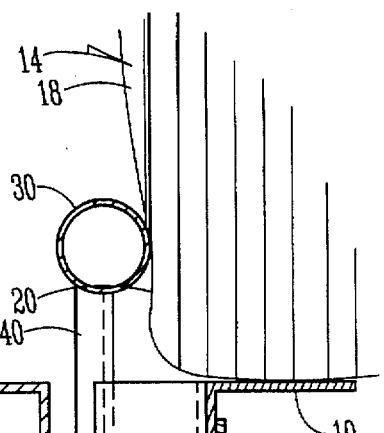
FIG. 3 is a sectional view similar to FIG. 2 of a prior art guide rail assembly.

The present invention will be described as it applies to its preferred embodiment. It is not intended that the present invention be limited to the described embodiment. It is intended that the invention cover all alternatives, modifications, and equivalents within the spirit and broad scope of the invention.

With continuing reference to the drawings, a conveyor 10 of an automatic conveyor car wash system is used to direct and move a vehicle 12 through the car wash. FIG. 1 shows a vehicle 12 approaching the conveyor 10 of an automatic conveyor car wash. The vehicle 12 includes driver-side tires 14 and passenger-side tires 16. Each tire (14,16) includes a wheel portion 18 and an adjacent tire surface 20. The wheel portion 18 is defined to include the wheel, wheel rim, hub cap, or other decorative wheel covering.

Upon entering the automatic conveyor car wash, the vehicle 12 first approaches a correlator section 22. This correlator section 22 aids the driver in correctly positioning the driver-side tires 14 of the vehicle 12 on the conveyor 10. Correlator guide rails 24 and support rails 26 rotate axially towards the center of the conveyor 10 to correctly align the driver-side tires 14 of the vehicle 12.

After passing the correlator section 22, a guide rail assembly 28 helps to ensure that the driver-side tires 14 of the vehicle 12 remain on the conveyor 10. As shown in FIG. 2, a main guide rail 30 is positioned above and outside of the conveyor 10 proximate the wheel portion 18 of the vehicle 12. An interior guide rail 32 is also provided on the opposite side of the conveyor 10.

As best shown in FIG. 3, the main guide rail 30 is positioned at such a height that it often contacts the wheel portion 18 on many vehicles. The main guide rail 30 must be positioned sufficiently high to prevent the drive-side tires 14 from jumping out of the conveyor, which is particularly problematic in the first 15 to 20 feet of the conveyor 10. This contact between the main guide rail 30 and the wheel portion 18 can result in scratching, marring, and other structural damage to the wheel portion 18.

Figure 4:
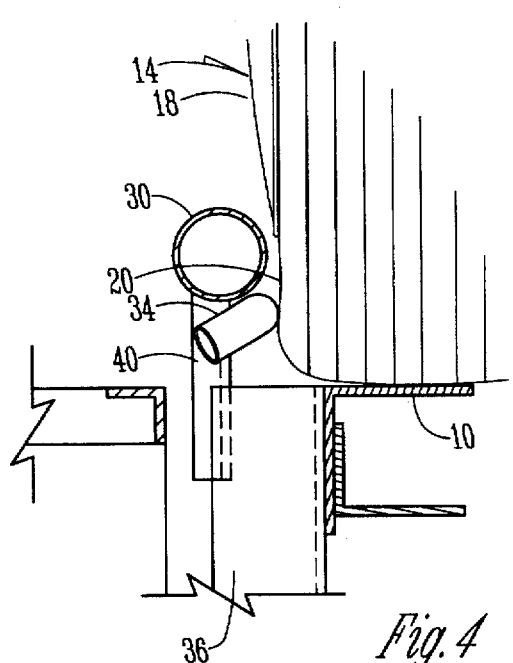
FIG. 4 is a sectional view similar to FIG. 2 showing the contact between a vehicle tire and the guide rail assembly of the present invention.
Figure 5:
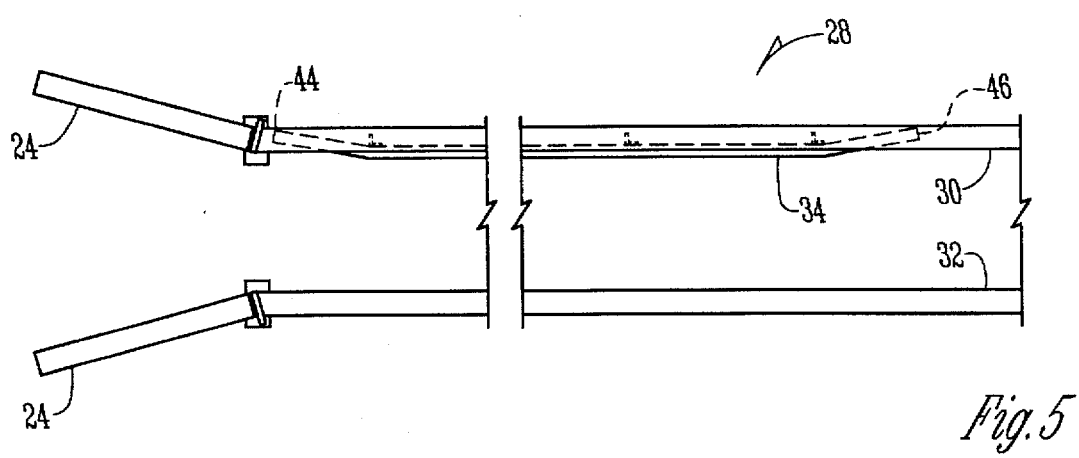
FIG. 5 is a top view of the guide rail assembly of FIG. 1.

The present invention also includes a lower guide rail 34 which is positioned below the main guide rail 30 and extends away from the main guide rail 30 and towards the conveyor 10. As best shown in FIG. 4, the lower guide rail 34 is positioned beneath the main guide rail 30 and towards the conveyor 10 such that the lower guide rail 34 contacts the tire portion 20, not the wheel portion 18. In addition, the lower guide rail 34 maintains a spaced apart relationship between the wheel portion 18 and the main guide rail 30, thereby preventing any structural damage to the wheel portion 18.

The conveyor 10 is supported by side supporting members 36 and 38. A conveyor system (not shown) is housed between the side supporting members (36,38) and is responsible for pushing or pulling the vehicle 12 through the car wash.

The main guide rail 30 is typically a metal pipe. It is preferred that the lower guide rail 34 also be a metal pipe. However, it is not essential that the guide rails be metal pipes. Other materials can be used. The guide rails can also be different profiles, either extruded or formed. Both the main guide rail 30 and the lower guide rail 34 are mounted to a guide rail support 40 attached to the side support member 36. The main guide rail 30 and lower guide rail 34 can be welded to or fastened to the guide rail support 40 using any conventional means. Similarly, the interior guide rail 32 is mounted on a guide rail support 42 attached to a side support member 38.

In its preferred form, the lower guide rail 34 is formed from a one inch ID pipe that is angled away from the conveyor 10 near its first end 44 and second end 46. Angling the lower guide rail 34 away from the conveyor 10 near its first end 44 is particularly important, as it helps guide the tires 14 of the vehicle 12 into a correct position upon entry into the conveyor 10.

It is normally only necessary to use a lower guide rail 34 along the first 15 to 20 feet of the conveyor 10. It is over this portion of the car wash that the driver is most apt to have control of the vehicle and steer the tires 14 against the main guide rail 30.

Adapting a prior art guide rail assembly to practice the present invention is a facile operation. Simply mount the lower guide rail 34 to the guide rail support 36 below the main guide rail 30 and towards the conveyor 10. It is important that the lower guide rail 34 is positioned towards the conveyor 10 such that the lower guide rail 34 contacts the tire portion 20 beneath the wheel portion 18 of vehicle 12. In addition, the lower guide rail 34 must maintain a spaced apart relationship between the wheel portion 18 and the main guide rail 30.

It can therefore be seen that the invention accomplishes at least all of its stated objectives.

What is claimed is:

1. A guide rail assembly for a conveyor in an automatic conveyor car wash having the advantage of protecting a wheel portion adjacent a tire portion of a vehicle, said guide rail assembly comprising:
    a main guide rail positioned outside said conveyor proximate said wheel portion; and
    a lower guide rail disposed below and away from said main guide rail toward said conveyor, whereby said lower guide rail contacting said tire portion below said wheel portion and said lower guide rail maintaining a spaced apart relationship between said wheel portion and said main guide rail.

2. The guide rail assembly of claim 1 wherein said lower guide rail is a pipe.

3. The guide rail assembly of claim 1 further comprising a means for mounting said main guide rail above said conveyor and a means for mounting said lower guide rail above said conveyor.

4. The guide rail assembly of claim 3 wherein said means for mounting said main guide rail and said lower guide rail includes a guide rail support extending above said conveyor.

5. The guide rail assembly of claim 4 wherein said lower guide rail is welded to said guide rail support.

6. The guide rail assembly of claim 1 wherein said lower guide rail is angled away from said conveyor near the entrance of said car wash.

7. The guide rail assembly of claim 1 wherein said main guide rail and said lower guide rail being integrally formed.

8. In a guide rail assembly for a conveyor in an automatic conveyor car wash having the advantage of protecting a wheel portion adjacent a tire portion of a vehicle, said guide rail assembly having a main guide rail positioned outside said conveyor proximate said wheel portion, wherein the improvement comprises:
    a lower guide rail disposed below and away from said main guide rail toward said conveyor, whereby said lower guide rail contacts said tire portion below said wheel portion and said lower guide rail maintains a spaced apart relationship between said wheel portion and said main guide rail.

9. A method of adapting a guide rail assembly for a conveyor in an automatic conveyor car wash to protect a wheel portion adjacent a tire portion of a vehicle, said guide rail assembly having a main guide rail positioned outside said conveyor proximate said wheel portion, said method comprising:
    providing a lower guide rail disposed below and away from said main guide rail toward said conveyor, whereby said lower guide rail contacting said tire portion below said wheel portion and said lower guide rail maintaining a spaced apart relationship between said wheel portion and said main guide rail.

10. The method of claim 9 wherein said lower guide rail is a pipe.

11. The method of claim 9 wherein said lower guide rail is angled away from said conveyor near the entrance of said car wash.

* * * * *